United States Patent
Brosnan et al.

(10) Patent No.: US 12,354,114 B1
(45) Date of Patent: Jul. 8, 2025

(54) SHELF INPUT/OUTPUT DEVICE SHARING SYSTEM

(71) Applicant: TOSHIBA GLOBAL COMMERCE SOLUTIONS, INC., Durham, NC (US)

(72) Inventors: Susan W. Brosnan, Raleigh, NC (US); Brad M. Johnson, Raleigh, NC (US); Stacy Arrington, Morrisville, NC (US)

(73) Assignee: TOSHIBA GLOBAL COMMERCE SOLUTIONS, INC., Durham, NC (US)

( * ) Notice: Subject to any disclaimer, the term of this patent is extended or adjusted under 35 U.S.C. 154(b) by 26 days.

(21) Appl. No.: 18/393,655

(22) Filed: Dec. 21, 2023

(51) Int. Cl.
  *G06Q 30/02* (2023.01)
  *G06Q 30/015* (2023.01)
  *G06Q 30/0208* (2023.01)

(52) U.S. Cl.
  CPC ....... *G06Q 30/015* (2023.01); *G06Q 30/0208* (2013.01); *G06Q 30/0281* (2013.01)

(58) Field of Classification Search
  CPC ................................ G06Q 30/15; G09F 3/208
  See application file for complete search history.

(56) References Cited

U.S. PATENT DOCUMENTS

| | | | | |
|---|---|---|---|---|
| 2013/0198039 A1* | 8/2013 | Sridharan | .......... | G06Q 30/0613 705/26.44 |
| 2015/0134429 A1* | 5/2015 | Katakwar | .......... | G06Q 30/0207 705/14.1 |
| 2015/0324635 A1* | 11/2015 | Tanaka | ............. | G06K 19/07749 340/5.91 |
| 2016/0171424 A1* | 6/2016 | Kannan | ............ | G06Q 10/06313 705/7.17 |
| 2020/0104863 A1* | 4/2020 | Gupta | ................... | G06K 7/1413 |
| 2021/0166280 A1* | 6/2021 | Koo | ........................ | H04J 14/08 |
| 2021/0233157 A1* | 7/2021 | Crutchfield, Jr. | ....... | G10L 15/22 |
| 2021/0319409 A1 | 10/2021 | Photowat | | |

FOREIGN PATENT DOCUMENTS

JP  4330478 B2  9/2009

OTHER PUBLICATIONS

Vochin M, Vulpe A, Boicescu L, Georgica Obreja S, Suciu G. An Intelligent Low-Power Displaying System withIntegrated Emergency Alerting Capability. Sensors (Basel). Feb. 6, 2019;19(3):666. doi: 10.3390/s19030666. PMID: 30736348; PMCID: PMC6387416. (Year: 2019).*

* cited by examiner

*Primary Examiner* — Vincent M Cao
(74) *Attorney, Agent, or Firm* — Patterson + Sheridan, LLP

(57) ABSTRACT

Embodiments herein describe connecting a customer in a retail store with an expert. In one example, this connection is made using a shelf IO device. Using a product ID provided by the shelf IO device, a computing system can identify an expert and determine whether they are available to help the customer. For example, the system may identify an expert that is currently in the same store as the customer, or the expert may be available to conduct a phone conversation or teleconference using the customer's mobile phone.

20 Claims, 5 Drawing Sheets

SHELF INPUT/OUTPUT DEVICE SHARING SYSTEM

BACKGROUND

Shoppers can get lots of information, from both reliable and questionable sources, about products they are considering purchasing, but that often falls short of the information needed to confirm whether they are purchasing the correct items, if they have all the items they need to complete a project, or whether the items will have a desired lifespan. Shoppers often purchase products not designed for the task or without the complete set of products, which is a common source of retailer dissatisfaction, even if it is not the store's fault.

DETAILED DESCRIPTION

Embodiments herein describe connecting a customer in a retail store with an expert. In one example, this connection is made using a shelf IO device. This device can be a Wi-Fi enabled button, a near-field communication (NFC) tag, an radio frequency identification (RFID) tag, electronic shelf label (ESL), and the like. For example, a customer may be at location, trying to decide which product to purchase to accomplish a task. The customer can decide he wants expert help, and use the shelf IO device to make the connection. In one embodiment, the customer can hit a button on the shelf IO device, or use a user device (e.g., a mobile phone) to transmit a request for expert help.

A computing system can then identify an expert and determine whether they are available to help the customer. For example, the system may identify an expert that is currently in the same store as the customer, or the expert may be available to conduct a phone conversation or teleconference using the customer's mobile phone. In another embodiment, the shelf IO device can indicate that an expert was found and then provide instructions to the customer to find the expert.

In one embodiment, the shelf IO device is used to identify experts for a particular product. For example, based on purchase history or known credentials, a retailer can determine one of their customers is likely an expert when it comes to a particular product. When the customer is near the product, the corresponding shelf IO device can display a prompt asking the customer if they would like to become a registered expert, and if so, provide instructions to the customer. Once registered, the customer can then be contacted by other customers who need help or advice when purchasing the particular product.

Advantages of Connecting Customers to Experts

One current solution for electronically soliciting help in a retail store is using a button (often on the aisle) that permits a customer to ring a store employee. However, these buttons are not associated with a particular product, but rather a general area of a store (e.g., hardware, or all the items in an aisle). Thus, pressing a need help button does not identify a particular product. As such, the employee that is summoned might not be an expert in the particular product the customer wants to purchase. There is currently no solution for electronically matching a product to an expert. However, the embodiments herein solve this technical problem by using shelf IO devices that are associated with a particular product (or variations of a product). The IO devices can store a product ID that permits the system to identify an expert for that particular product. In that way, the system can more accurately determine the needs of a customer and match them to an expert who can help.

Figure 1:
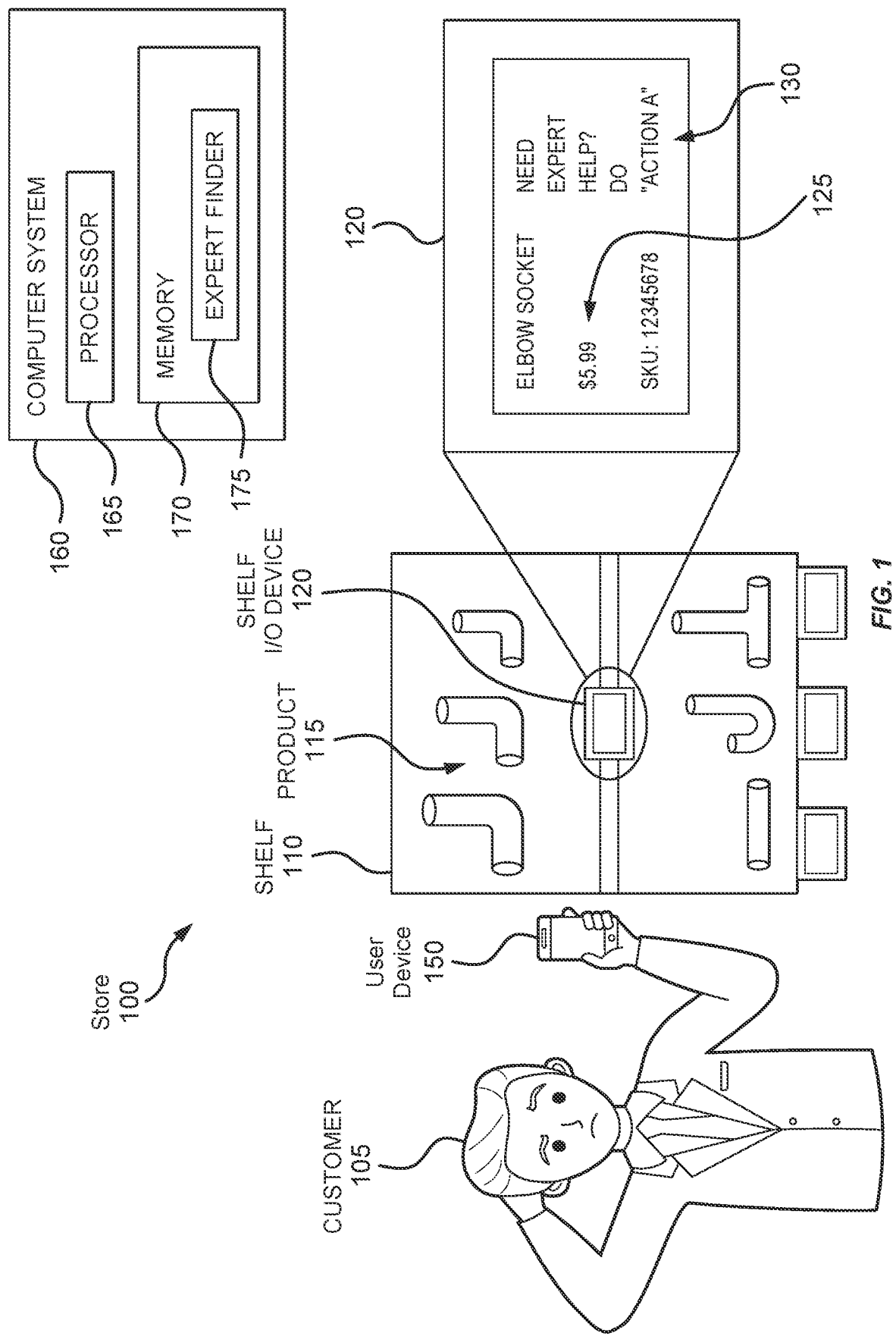
FIG. 1 illustrates a system in a store for connecting a customer with an expert, according to one embodiment.

FIG. 1 illustrates a system in a store 100 for connecting a customer 105 with an expert, according to one embodiment. FIG. 1 illustrates a shelf 110 in the store 100, on which several products 115 are located. For example, the products 115 can be plumbing products such as different elbow sockets, downpipes, T-pipes, and the like. In one embodiment, the different products 115 have respective shelf IO devices 120. These devices 120 can include Wi-Fi enabled buttons, NFC tags, RFID tags, ESLs, and the like. The shelf IO devices 120 can be any device that can receive input from and/or transmit data to the customer 105. For example, in some embodiments, the customer 105 can press a button on the shelf IO device 120 to request help from an expert. In other embodiments, the customer 105 may move a user device 150 (e.g., a mobile phone) close to the shelf IO device 120 so it can receive data from the device 120, such as an ID of the product 115.

In any case, the shelf 110 can include a shelf IO device 120 for each product 115 (or a variation of products). For example, there may be one shelf IO device 120 for a product that comes in different sizes (e.g., a pipe that has different widths (⅜ of an inch, ½ inch, ¾ inch, etc.) but the same length) but may be sold for the same price. In other examples, each product 115 has its own shelf IO device 120.

As shown by the blowout, the shelf IO device 120 can display product information 125, such as the name of the product, its specifications (size, weight, etc.), price, and product ID (e.g., a stock keeping unit (SKU), universal product code (UPC), barcode, or QR code). These are just a few examples of the product information 125 that can be shown on the shelf IO device 120.

In addition, the shelf IO device 120 displays expert contact information 130. This information informs the customer how he can request expert help regarding the product 115 corresponding to the shelf IO device 120. In FIG. 1, the device 120 shows "Action A" which the customer can perform to request expert help. This action can include pressing a button on the shelf IO device 120, bringing the user device 150 close to the device 120 so that NFC or RFID communication is established, interacting with an active display on the shelf IO device 120, capturing an image of a QR code displayed on an electronic display in the shelf IO device, and the like. For example, the customer 105 may be confused on which of size of the elbow sockets he should buy, or if he needs other components besides the elbow sockets (e.g., an adhesive) in order to complete a task. The customer 105 can then perform Action A in order to request expert assistance.

In one embodiment, in response to the user performing Action A, the shelf IO device 120 transmits a product ID of the product 115 (e.g., the SKU) to an expert finder 175. However, in other embodiments, the user device 150 receives the product ID from the shelf IO device 120 and forwards the product ID to the expert finder 175.

The expert finder 175 can be a software application (or a suite of software applications) that execute in the computing system 160 to identify and connect an expert of the product 115 with the customer 105. This process is described in more detail in the figures below.

The computing system 160 can be a single computing device (e.g., a server) or a plurality of interconnected computing devices (e.g., a data center or a cloud computing environment). The computing system 160 includes a processor 165 which represents any number of processing elements that each can include any number of processing cores. The computing system 160 also includes memory 170 that stores the expert finder 175. The memory 170 can include volatile memory elements, non-volatile memory elements, and combinations thereof.

Figure 2:
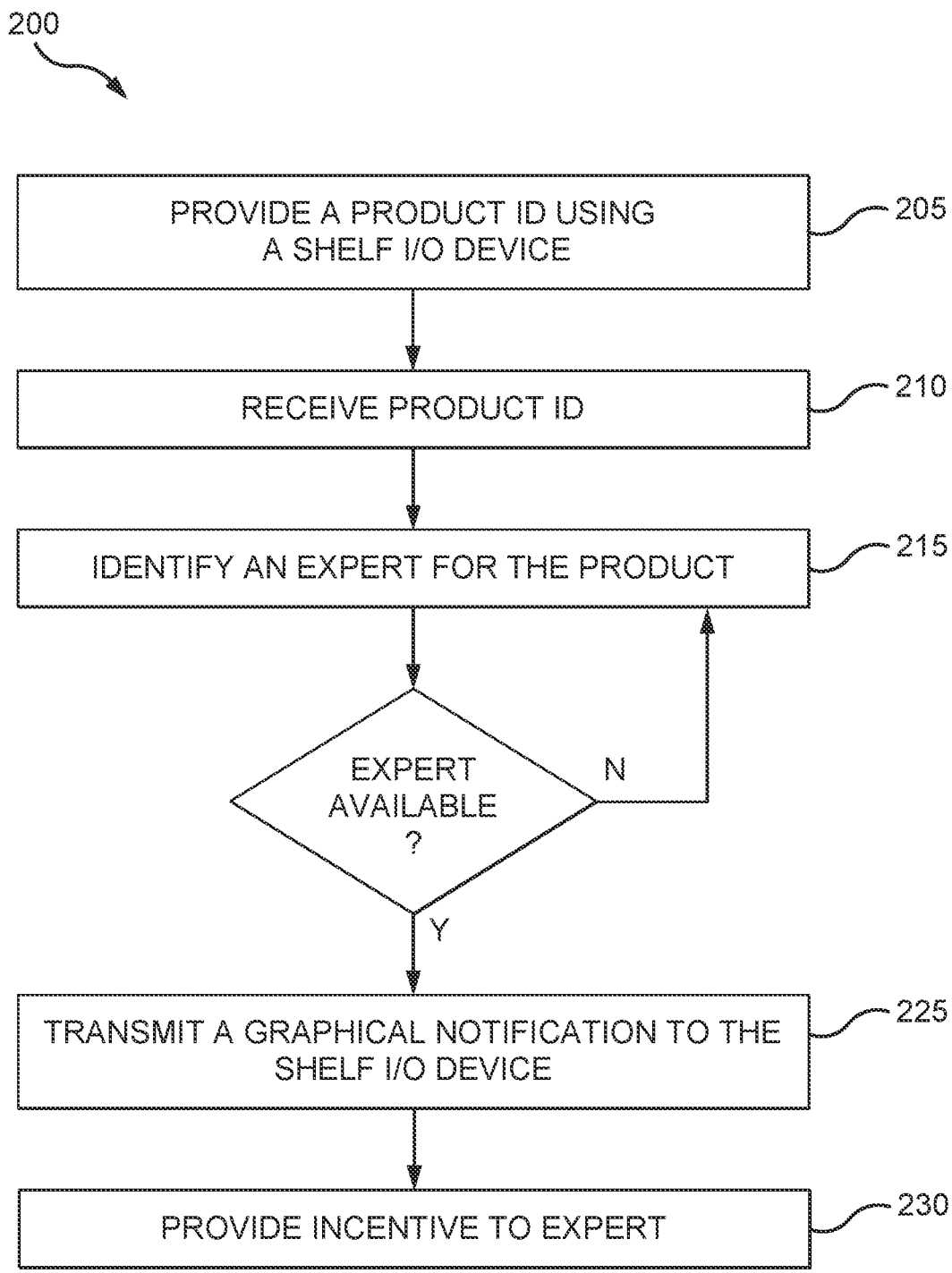
FIG. 2 is a flowchart for connecting a customer with an expert using a shelf IO device, according to one embodiment.

FIG. 2 is a flowchart of a method 200 for connecting a customer with an expert using a shelf IO device, according to one embodiment. At block 205, the shelf IO device provides a product ID regarding a product. The shelf IO device either transmits a product ID to an expert finder (e.g., the expert finder 175 in FIG. 1), or transmits the product ID to the customer's user device which in turn transmits the product ID to the expert finder.

In one embodiment, the shelf IO device receives an input indicating a customer needs help or advice related to a product in a retail store. The shelf IO device can learn the customer wants help or advice by the customer pressing a button on the shelf IO device, bringing a mobile close to the device so that NFC communication is established, interacting with an active display that is part of the shelf IO device, and the like. In this manner, the shelf IO device can actively detect when the customer wants to contact an expert, and provide the product ID in response to either the expert finder or to the customer's user device.

In one embodiment, after actively detecting the customer has requested expert assistance, the shelf IO device may have a Wi-Fi connection (or be hardwired) so it can communicate with a network in the store. In that case, the shelf IO device can transmit the product ID to the expert finder without assistance from the customer's user device. In another example, the user device may have an application for the store, which helps the user to track their purchases, make online orders, receive coupons, and the like. This application can receive the product ID from the shelf IO device and then forward it to the expert finder.

In another embodiment, the shelf IO device may provide the product ID to the customer's user device passively rather than actively. As one example, the shelf IO device may be a ESL with a display that displays a QR code that, when scanned using a camera in the user device, provides the product ID and kicks off the process for requesting expert help. In another example, the shelf IO device may be an RFID tag that is scanned by the customer's user device, where the reply message from the RFID tag includes the product ID. In these examples, the shelf IO device can provide the product ID to the customer device (which forwards it to the expert logic) without containing logic that identifies when the product ID was scanned. Relying on the customer's user device to communicate the product ID to the expert finder may be useful if the shelf IO device does not have a Wi-Fi connection, or if the shelf IO device is an RFID device or displays a QR code, and thus might not know when the user has requested expert advice.

In one embodiment, the shelf IO device is attached to the same shelf that stores the product. For example, the product may be placed on the shelf while the shelf IO device is attached to the shelf so it is disposed below the product.

At block 210, the expert finder receives the product ID. As discussed above, the shelf IO device may (via a network) transmit the product ID to the expert finder without using the customer's user device or the customer's user device may transmit the product ID to the expert finder. In either case, the method 200 benefits from retrieving a product ID for a particular product from a shelf IO device that corresponds to that product. Thus, unlike other techniques for requesting help in a store, the method 200 can provide expert assistance for a particular product.

At block 215, the expert finder identifies an expert for the product. For example, the expert finder may maintain a list of previously vetted experts for each product carried by the store. Using the product ID, the expert finder can identify a product, and in turn, identify the experts for that product. The process of identifying (or vetting) experts for particular produces will be discussed in more detail in FIG. 5 below.

At block 220, the expert finder determines whether an expert is available. In one embodiment, the expert finder may first look for experts that are in the same store as the customer who requested the help. For instance, when in a store, the expert may use the store app on her mobile phone. For example, the expert may give permission to the store to track her location when the store application is open. In this manner, the expert finder can determine if there is an expert in the same store as the customer.

In another example, if no expert is available at the location, the expert finder can send alerts, such as text messages, to one or more experts to determine whether they are currently available to help the customer. The expert can reply with a yes or a no to indicate their availability. In this case, the expert may not be able to meet with the customer in person.

If the expert is not available (e.g., does not have time currently or is busy doing something else), the method 200 returns to block 215 where the expert finder identifies another expert for the product.

However, if the expert replies saying he is available, the method 200 proceeds to block 225 where the expert finder transmits a graphical notification to the shelf IO device associated with a customer in the store to inform the customer that an expert match was made. In this example, the expert finder can control the shelf IO device to tell the customer a match was made using a graphical element (e.g., text, pictures, or combinations thereof) depicting a match with the expert regarding the product. In that case, the expert finder could change a display of the shelf IO device to tell the customer that a match was made and how to meet up with the expert (e.g., meet the expert at Aisle 10, or wait there for the expert to come to you). Alternatively, the expert finder could display a message on the customer's user device indicating the match.

If the expert is not at the same location, the store application on the customer's user device can connect the customer to the expert. For example, the application could initiate a telephone call, a video teleconference, or a chat. The application can hide the contact information of the customer and the expert (e.g., their telephone numbers and names) to maintain privacy.

At block 230, the expert finder provides an incentive to the expert. For example, when contacting the experts at block 220, the expert finder may advertise an incentive, such as a store coupon, a rebate on an item, points as part of a reward system, and the like if the expert helps the customer. The expert finder can then provide the expert with the incentive after helping the customer. For example, if the customer indicates the advice was helpful, the expert finder provides the incentive to the expert. However, providing an incentive to the expert is optional.

Figure 3:
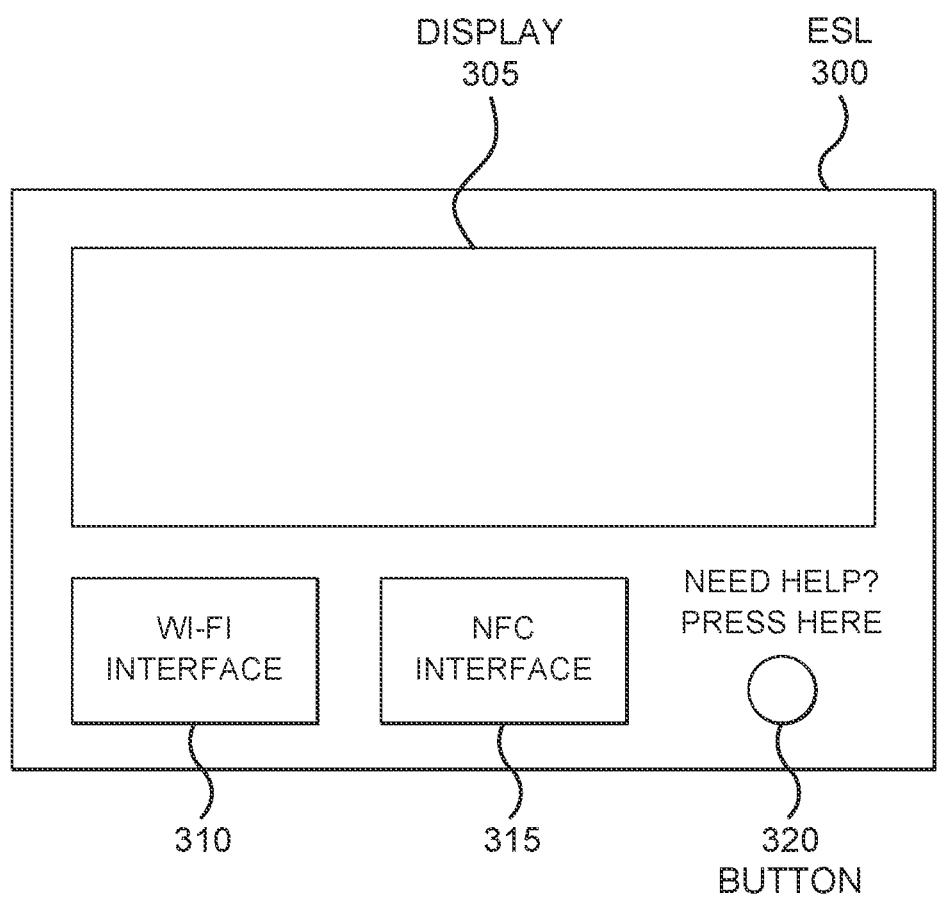
FIG. 3 illustrates an electronic shelf label, according to one embodiment.

FIG. 3 illustrates an ESL 300, according to one embodiment. The ESL 300 includes a display 305, Wi-Fi interface 310, NFC interface 315, and a button 320. The display 305 may be an electronic ink display which saves power relative to other types of display screens. If the ESL 300 operates under battery power, the display 305 may be an electronic ink display. But in other embodiments, the display 305 may be other types of displays such as LED or LCD, and may be coupled to a power source rather than being battery operated. In other embodiments, the display 305 may be a touch screen so that a user can interact with it, such as selecting a virtual button indicating the customer wants help or advice from an expert.

The Wi-Fi interface 310 can include a transmitter/receiver (transceiver) for transmitting and receiving Wi-Fi data. For example, the Wi-Fi interface 310 can connect to a Wi-Fi network in the store. The Wi-Fi interface 310 can be used by the store employer to remotely change what is displayed on the display 305. For example, the price of the product can be updated if the corresponding product is put on sale.

The NFC interface 315 permits the ESL 300 to use NFC to communicate with store employees' devices as well as the customer's user device. A store employee can use the NFC interface 315 to update the display 305, or the customer's user device may use the NFC interface 315 to receive the product ID in order to contact an expert, as discussed above.

The button 320 can be a physical actuated button or a capacitive button. In this example, the ESL 300 includes printed text that instructs a customer to press the button 320 if they need help (e.g., to contact an expert). This text could be printed on the ESL 300 or could be output on the display 305.

FIG. 3 is just one example of a ESL 300 and its features. For example, other ESL implementations may not include all the features shown. One ESL may include the Wi-Fi interface 310, but not the NFC interface 315 or the button 320. Another ESL may include the NFC interface 315 but not the Wi-Fi interface 310 but or the button 320. Yet another ESL may include the Wi-Fi interface 310 and the button 320 but not the NFC interface 315.

Figure 4:
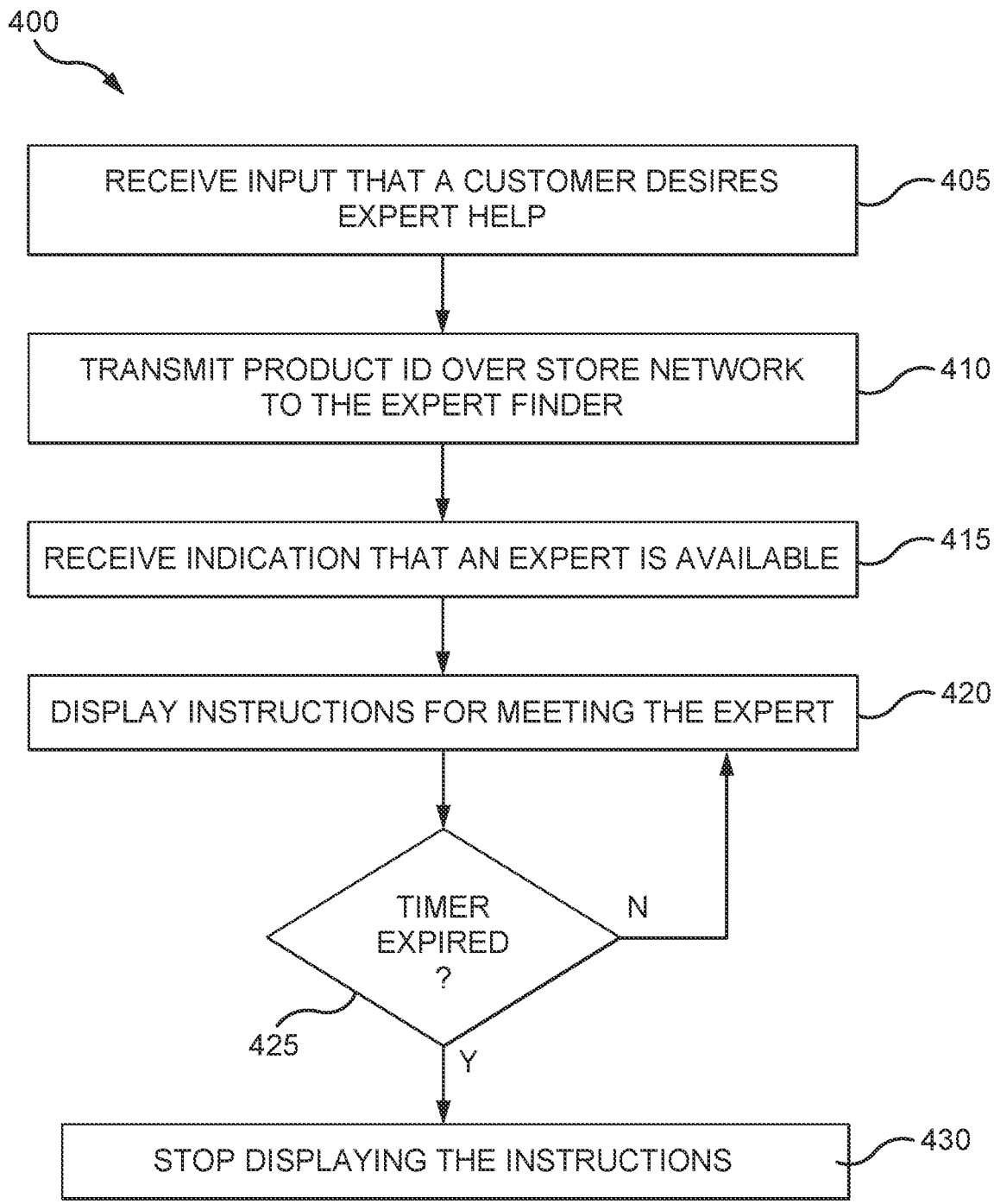
FIG. 4 is a flowchart for connecting a customer with an expert using an ESL, according to one embodiment.

FIG. 4 is a flowchart of a method 400 for connecting a customer with an expert using an ESL, according to one embodiment. At block 405, the ESL receives input that a customer desires expert help related to a product in a retail store. The ESL can learn the customer wants help or advice by the customer pressing a button on the ESL (e.g., the button 320). In another embodiment, the ESL learns the customer wants help or advice by the customer bringing a mobile phone close to the device so that NFC communication is established using a NFC interface 315. In another embodiment, the ESL may have an interactive (e.g., touch screen) display which displays a virtual button that the customer can interact with to request expert help. In this manner, the shelf IO device can actively detect when the customer wants to contact an expert.

At block 410, the ESL transmits a product ID over a store network to the expert finder. In one embodiment, after detecting the customer has requested expert assistance, the ESL can use a Wi-Fi connection (e.g., the Wi-Fi interface 310 in FIG. 3) or use an Ethernet (hardwired) connection to communicate with a network in the store. In this example, the ESL can transmit the product ID to the expert finder without assistance from the customer's user device. Thus, the customer does not have to use her own mobile device to solicit expert help. This can be useful for customers who do not have mobile phones or who have not install the store's app.

At block 415, the ESL receives an indication that an expert is available. For example, the expert finder may have performed blocks 215 and 220 to identify an expert for the product using the product ID and determine that the expert is available and willing to help the customer. The ESL can then receive a message from the expert finder (e.g., using the Wi-Fi or Ethernet connection) indicating the expert is available and how to connect with the expert.

At block 420, the ESL displays instructions for meeting the expert. In one embodiment, the ESL updates its display to provide the instructions—e.g., "go to aisle 10 to meet the expert" or "an expert is coming, please stay here." However, in other embodiments, rather than using the display, the ESL could have another output device such as a light that flashes to indicate an expert is on her way and the customer should remain at the current location.

Since the display of the ESL may be small, the instructions may replace the normal product information that is displayed on the ESL. For example, the instructions for meeting the ESL may take up the entire screen which means the display does not display the name of the product, price, SKU, etc. (or at least may not display all this information when displaying the instructions for meeting the expert).

At block 425, the ESL determines if a timer is expired. The ESL may display the instructions for meeting the expert until the timer expires (e.g., one minute). However, in other embodiments, the ESL may display the instructions until the customer provides input indicating the expert has arrived.

After the timer expires, the method 400 proceeds to block 430 where the ESL stops displaying the instructions for meeting the expert. The ESL may instead display any product information that was removed to make room for the instructions. That is, if the ESL removed the product name and price when displaying the instructions for meeting the expert at block 420, the ESL can put this information back on the display at block 430.

One advantage of the method 400 is it can performed without using a customer's user device. This may result in an easier and less confusing process to connect a customer with an expert, especially if the customer has not yet installed the store's app on their user device. In the method 400, the ESL can receive the customer input, provide the product ID to the expert finder, receive confirmation that an expert was found, and instruct the customer how to meet the expert.

Figure 5:
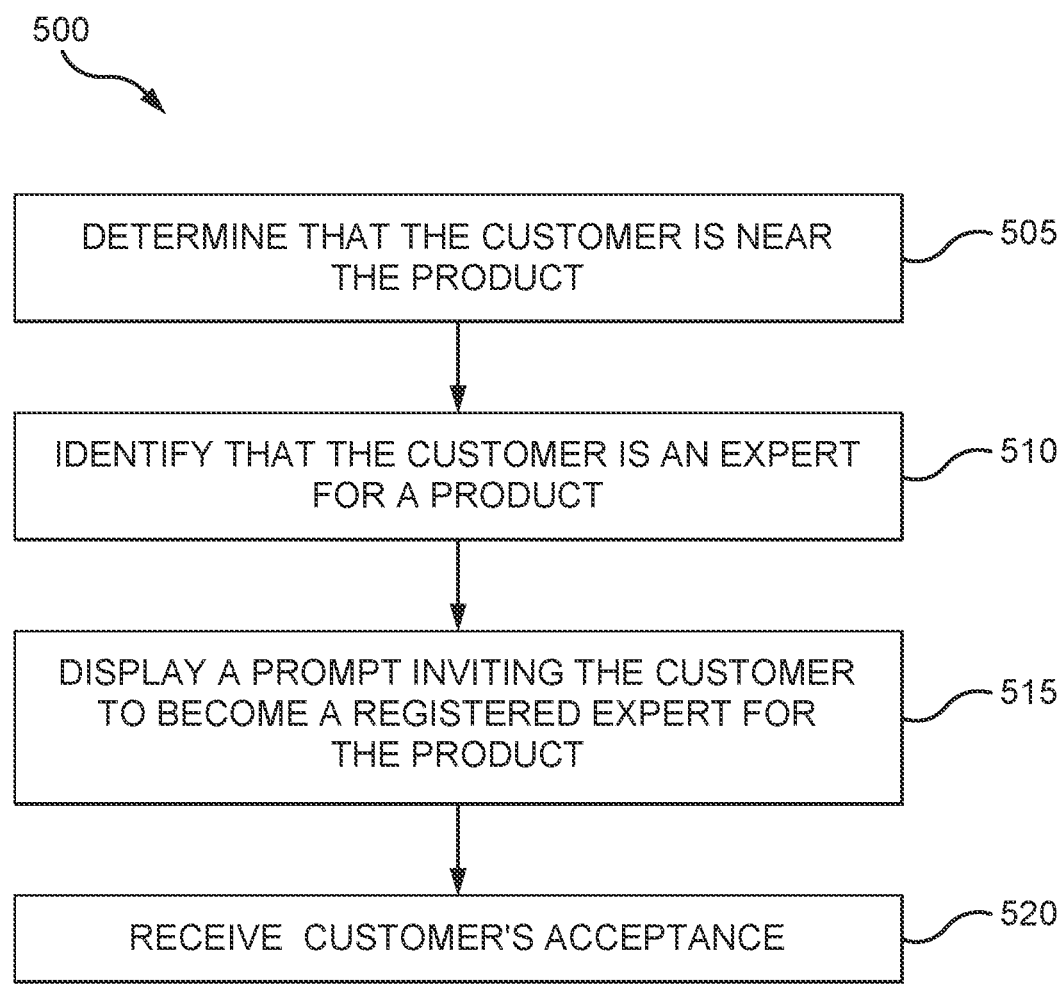
FIG. 5 is a flowchart for identifying and registering an expert using a shelf IO device, according to one embodiment.

FIG. 5 is a flowchart of a method 500 for identifying and registering an expert using a ESL, according to one embodiment. Put differently, the method 500 describes techniques for using an ESL to register an expert for a particular product in a store.

At block 505, the store determines that a customer is near a particular product. For instance, the customer may have given the store's app permission to follow the customer's location when in the store, or the customer's mobile device may have come close to an ESL and established NFC communication.

At block 510, the store determines that the customer is an expert for the product. In one embodiment, the store determines the customer is an expert based on their purchase history. For example, if the customer is near a toilet and has bought ten of the toilets in the last three months, the store assumes the customer has enough experience with installing that particular toilet to be an expert. In another embodiment, when registering on the store's app, the app may query the customer for credentials or learn their experience (e.g., a certified electrician, a general contractor, professional chef, etc.).

At block 515, after determining the customer is an expert, the ESL for the product displays a prompt inviting the customer to become a register expert for the product. For example, like when displaying the instructions for meeting an expert as discussed in method 400, here, the ESL can change its display from outputting product information to solicitation for the customer to become a registered expert for the product corresponding to the ESL—e.g., "You seem to be an expert with PRODUCT A, would you like to help others? If so, register today and gain rewards!"

The ESL could provide instructions for registering as an expert such as displaying a QR code that the customer can scan or telling the customer to proceed to a customer service desk in the store. In another example, the ESL can tell the customer to hold their phone close to the ESL so NFC communication can be established. The ESL can then open a graphical user interface (GUI) or website on the customer's phone for completing the registration process.

In another embodiment, the ESL may perform automatic registration. For example, by bringing the customer's phone and establishing NFC communication, the ESL can verify the customer's identity (to confirm it is not a different customer who might happen to be nearby) and then automatically register the customer as an expert. For instance, the ESL may use its Wi-Fi interface to tell the store that the customer has registered as an expert.

At block 520, the store receives the customer's acceptance. Stated differently, the customer finishes the registration process using the instructions provided by the ESL. This can include, e.g., registering on the customer's mobile device, in person at the store, or using the ESL. In this manner, the ESL (or another shelf IO device) can be used to register a customer as an expert for a particular product.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements discussed above, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method comprising:
   providing an identification (ID) of a product in a store using a shelf input/output (IO) device attached to a shelf in the store;
   receiving the product ID at a computing system separate from the shelf IO device;
   identifying an expert for the product using the product ID;
   determining that the expert is available by transmitting a query to a user device of the expert; and
   responsive to determining that the expert is available, transmitting a graphical notification to the shelf IO device associated with a customer in the store, wherein the graphical notification comprises a graphical element depicting a match with the expert regarding the product.

2. The method of claim 1, wherein providing the product ID comprises one of:
   wirelessly transmitting the product ID from the shelf IO device to a user device of the customer in the store, wherein the computing system receives the product ID via the user device of the customer;
   displaying a QR code on the shelf IO device that comprises the product ID, wherein the computing system receives the product ID via the user device of the customer; or
   wirelessly transmitting the product ID from the shelf IO device to a Wi-Fi network in the store which forwards the product ID to the computing system.

3. The method of claim 1, further comprising:
   receiving, at the shelf IO device, input from the customer indicating the customer desires expert advice regarding the product.

4. The method of claim 3, wherein receiving the input comprises:
   determining the customer pressed a button on the shelf IO device, wherein providing the product ID is performed in response to the customer pressing the button.

5. The method of claim 3, wherein receiving the input comprises:
   determining the customer moved a user device close enough to establish wireless communication with the shelf IO device, wherein providing the product ID is performed after establishing wireless communication between the user device of the customer and the shelf IO device.

6. The method of claim 1, further comprising, after determining the expert is available:
   providing instructions to the customer for meeting the expert in the store.

7. The method of claim 6, wherein a display of the shelf IO device is changed to display the instructions for meeting the expert.

8. The method of claim 1, further comprising, after determining the expert is available:
   outputting instructions to permit a user device of the customer to communicate with a user device of the expert.

9. The method of claim 1, wherein determining that the expert is available comprises:
   advertising an incentive to the expert for helping the customer; and
   after determining the expert met with the customer, providing the incentive to the expert.

10. The method of claim 1, wherein the shelf IO device comprises at least one of an electronic shelf label (ESL), a Wi-Fi enabled button, a near-field communication (NFC) tag, or an radio frequency identification (RFID) tag.

11. A system, comprising:
   a shelf IO device configured to attached to a shelf in a store and provide an identification (ID) of a product in the store; and
   a computing system, comprising:
      one or more processors; and
      one or more memories configured to store an application, which when executed by the one or more processors performs an operation, the operation comprising:
         receiving the product ID;
         identifying an expert for the product using the product ID;
         determining that the expert is available by transmitting a query to a user device of the expert; and
         responsive to determining that the expert is available, transmitting a graphical notification to the shelf IO device associated with a customer in the store, wherein the graphical notification comprises a graphical element depicting a match with the expert regarding the product.

12. The system of claim 11, wherein providing the product ID using the shelf IO device comprises one of:
   wirelessly transmitting the product ID from the shelf IO device to a user device of the customer in the store, wherein the computing system receives the product ID via the user device of the customer;
   displaying a QR code on the shelf IO device that comprises the product ID, wherein the computing system receives the product ID via the user device of the customer; or
   wirelessly transmitting the product ID from the shelf IO device to Wi-Fi a network in the store which forwards the product ID to the computing system.

13. The system of claim 11, wherein the shelf IO device is configured to receive input from the customer indicating the customer desires expert advice using a button on the shelf IO device.

14. The system of claim 11, wherein the shelf IO device is configured to receive input from the customer indicating the customer desires expert advice by the customer moving a user device close enough to establish wireless communication with the shelf IO device, wherein the shelf IO device is configured to provide the product ID after establishing wireless communication with the user device.

15. The system of claim 11, wherein the operation comprises, after determining the expert is available:
   providing instructions to the customer for meeting the expert in the store, wherein the computer system is configured to change a display of the shelf IO device to display the instructions for meeting the expert.

16. A non-transitory computer-readable storage medium having computer-readable program code embodied therewith, the computer-readable program code executable by one or more computer processors to perform an operation, the operation comprises:
   receiving a product ID that is provided by a shelf IO device attached to a shelf in a store, wherein the shelf IO device is separate from a computing system containing the one or more computer processors;
   identifying an expert for a product using the product ID;
   determining that the expert is available by transmitting a query to a user device of the expert; and
   responsive to determining that the expert is available, transmitting a graphical notification to the shelf IO device associated with a customer in the store, wherein the graphical notification comprises a graphical element depicting a match with the expert regarding the product.

17. The computer-readable storage medium of claim 16, wherein the operation further comprises, after determining the expert is available:
   providing instructions to the customer for meeting the expert in the store.

18. The computer-readable storage medium of claim 17, wherein the operation further comprises:
   changing a display of the shelf IO device to display the instructions for meeting the expert.

19. The computer-readable storage medium of claim 16, wherein the operation further comprises, after determining the expert is available:
   outputting instructions to permit a user device of the customer to communicate with a user device of the expert.

20. The computer-readable storage medium of claim 16, wherein determining that the expert is available comprises:
   advertising an incentive to the expert for helping the customer; and
   after determining the expert met with the customer, providing the incentive to the expert.

* * * * *